United States Patent [19]

Sindelar et al.

[11] 4,360,917
[45] Nov. 23, 1982

[54] PARITY FAULT LOCATING MEANS

[75] Inventors: Emmett F. Sindelar, Moreland Hills; Lawrence R. Ober, Chagrin Falls, both of Ohio

[73] Assignee: The Warner & Swasey Company, Cleveland, Ohio

[21] Appl. No.: 196,510

[22] Filed: Oct. 14, 1980

Related U.S. Application Data

[63] Continuation of Ser. No. 10,077, Feb. 7, 1979, abandoned.

[51] Int. Cl.$^3$ ............................................. G06F 11/10
[52] U.S. Cl. ........................................ 371/49; 371/51
[58] Field of Search ................... 371/13, 49, 51, 29; 364/200, 900

[56] References Cited

U.S. PATENT DOCUMENTS

| | | | |
|---|---|---|---|
| 3,619,585 | 11/1971 | Edmondson | 371/13 |
| 3,831,148 | 8/1974 | Greenwald et al. | 371/51 |
| 3,988,714 | 10/1976 | Bardotti | 371/49 |
| 4,019,033 | 4/1977 | Parmet | 371/51 |
| 4,049,956 | 9/1977 | Van Veen | 371/51 |
| 4,100,403 | 7/1978 | Eggenberger et al. | 371/38 |
| 4,183,096 | 1/1980 | Cenker et al. | 371/13 |

Primary Examiner—Charles E. Atkinson
Attorney, Agent, or Firm—Howard G. Massung

[57] ABSTRACT

Apparatus and method are provided for isolating errors in a logic system employing memory and having a data transmission bus structure. A memory readout error is detected in a multibit word having a parity bit added thereto by parity checking means. A readout error, commonly referred to as a "soft read error", is an erroneous output from a memory device that is transient in nature in that the soft read error is corrected when the memory device is refreshed or reread. It is contemplated that such a readout error may take place when a multibit word is outputted from a refresh type random access memory such as a dynamic random access memory (RAM) or a write after read core memory. In response to the detection of an error condition in the memory by the parity bit error detector, the memory is read again in order to obtain a second output. If the second output provided by the memory does not contain a parity error, the prior error is considered to be a soft read error and the second data word is forwarded to a utilization device such as a CPU. If the second output from the memory also contains a parity error, such an error is considered to be a "hard read error" and the data is not utilized. Information relating to a parity error occurring in the memory which is not a soft read error is stored for diagnostic purposes. Parity of the data is again checked at the utilization device in order to determine if the transmission means used to transfer the data from the memory to the utilization device has caused a data error. Means of inducing parity errors to test the parity detection circuitry and means to override parity checking are also provided.

1 Claim, 5 Drawing Figures

PARITY FAULT LOCATING MEANS

This is a continuation, of application Ser. No. 10,077 filed on Feb. 7, 1979, now abandoned.

BACKGROUND OF THE INVENTION

This invention relates to bit error detection, and more particularly to the detection of a bit error in a system and the isolation of such a bit error within the system. Specifically, the invention concerns the detection of a readout or "soft read error" in a multibit word outputted from a memory in response to a read signal applied thereto combined with the detection of transmission means errors wherein there is provided the capability of distinguishing between readout and transmission errors.

In interrogating or reading most types of memories, including both static and dynamic type memories, there is a possibility of a false output known as a "soft read error" from the memory device. For example, an eight bit binary word may be outputted with a bit error in one of the bit positions. The soft read error is most prevalent in memories where the stored information requires periodic refreshing or is destroyed during a read operation.

In a common dynamic random access memory fabricated as an integrated circuit on a chip substrate, data storage facilities are provided by a plurality of capacitors. Because information is stored as a charge on a small substrate capacitor in the memory device, the level of charge on these capacitors must be sensed in order to output data. In the process of reading or sensing this charge, the charge is removed from the capacitors. The memory device is constructed in order to automatically refresh the memory during a read operation in order that the capacitor may be recharged to retain information.

Two output paths exist for data read from the capacitors in the typical dynamic random access memory. One path is the re-write or refresh path. The second path is the data output path which provides the signal utilized by the memory means user. Because of the possible gain or noise differences existing between the two paths, correct information could be written into the memory during a refresh cycle, while false information is being outputted to the memory device user.

It can therefore be seen that there exists an error mode common to all types of electronic memory devices, but especially prevalent in dynamic type memory devices, that is transient in nature and is also self-correcting. Typical logic systems employing memory means and having error detection means for the aforesaid memory means commonly cause the entire system to cease functioning upon any detection of bit errors including "soft read errors." This situation causes a large number of unnecessary disruptions to the system operation. It can be seen that it would be desirable to have a means of distiguishing between self-correcting soft read errors and hard read errors in order that the memory devices may be more efficiently utilized.

There is a substantial amount of prior art in the area of bit error detection and correction including Chelberg et al U.S. Pat. No. 4,084,236; Nibby Jr. et al U.S. Pat. No. 4,077,565; Carter U.S. Pat. No. 3,949,208; Smith U.S. Pat. No. 3,898,443; Rosenfeld U.S. Pat. No. 3,693,153; Carter et al U.S. Pat. No. 3,688,265; Flinders et al U.S. Pat. No. 3,646,516; Weisbeck U.S. Pat. No. 3,599,146; and Kurtz U.S. Pat. No. 3,568,153.

Although the prior art discloses many means for detecting and correcting bit errors, none of the above noted art relates to the detection of soft read errors and a method of handling soft read errors in an efficient manner.

SUMMARY OF THE INVENTION

The instant invention relates to a means for distinguishing between soft and hard memory read errors in a logic system in order to enable the system to continue operation in the presence of a soft read error. The output of the memory of the logic system is checked for parity errors in order to assure that the proper data is outputted. In response to the detection of an error condition in the memory by the parity bit error detector, the memory is read again in order to obtain a second output. If the second output provided by the memory does not contain a parity error, the prior error is considered to be a soft read error and the data word is then utilized by the logic system. If the second output from the memory does contain a parity error, such an error is considered to be a hard read error and the data is not utilized by the logic system. Information relating to a parity error occurring in the memory which is not a soft read error is stored for diagnostic purposes. Parity of the data is again checked at the utilization device in the logic system in order to determine if the transmission means used to transfer the data from the memory to the utilization device of the logic system has caused a data error. Means of inducing parity errors to test the parity detection circuitry and means to override parity checking are also provided.

DETAILED DESCRIPTION OF AN EXEMPLARY EMBODIMENT

Figure 1:
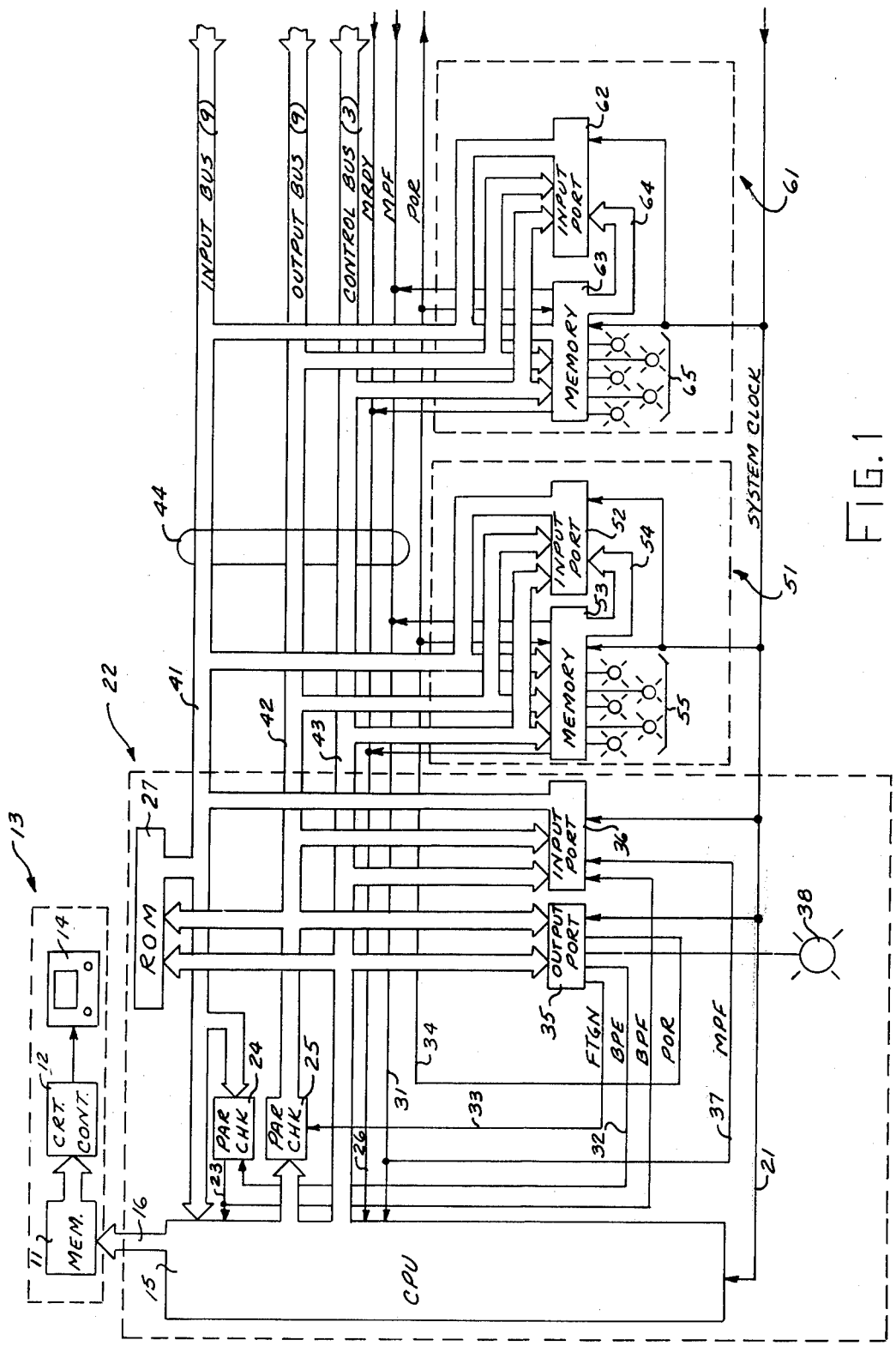
FIG. 1 illustrates in block diagram form a computer logic circuit employing the instant invention.

Referring now to FIG. 1 of the drawings, there is disclosed the instant invention embodied in a computer logic circuit. Although this description is made with respect to a computer logic system, it should be appreciated that the invention is applicable to any logic system employing memory means. The computer logic system disclosed in FIG. 1 consists of a processor module designated 22, two memory modules designated 51 and 61, and a display module designated 13. Interconnecting the processor module 22 and the memory modules 51 and 61 is a bus structure 44 consisting of an input bus 41, an output bus 42, a control bus 43, a memory ready line 26, and a memory parity fault line 31. The processor module 22 is interconnected with the display module 13 by a display bus 16.

The processor module 22 consists of a central processing unit (CPU) 15, a read only memory (ROM) 21, an input port 36, an output port 35, a parity checking circuit 24, a parity generator 25, and an indicator light 38.

The CPU 15 may conveniently take the form of many conventional central processing units presently on the market, including a processing unit such as an Intel 8080 manufactured by the Intel Corporation, 3065 Bowers Avenue, Santa Clara, Calif. Preferably, however, the CPU 15 takes the form illustrated and described in U.S. Pat. No. 4,045,782 to T. M. Anderson et al assigned to the assignee of the instant invention, which patent is hereby incorporated by reference.

Associated with the CPU 15 is ROM 27, which is adapted to provide program instructions to the CPU 15 in response to inputs provided to the ROM 27 on the output bus 42 and the control bus 43. The input port 36 and the output port 35 are utilized in a manner described below to facilitate the temporary storage of information used in the error detection process. Similarly, parity checking circuit 24, parity generator 25, and indicator light 38 are used in a similar manner as more fully described below.

Figure 2:
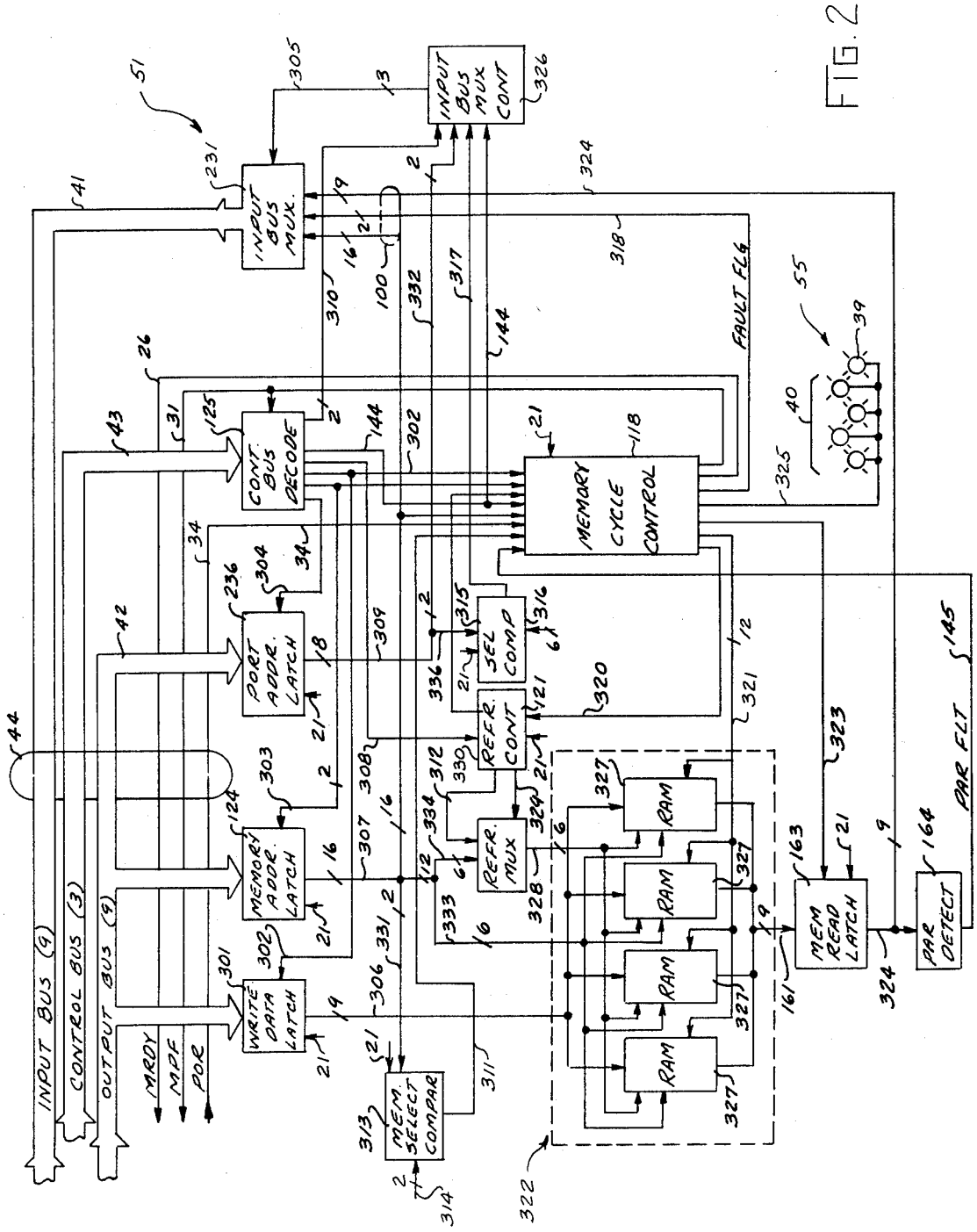
FIG. 2 shows in greater detail a memory module of FIG. 1.

The memory modules 51 and 61, which are substantially identical, are more fully disclosed in FIG. 2 of the drawings. In general, the memory modules 51 and 61 are comprised of memory circuits 53, 63; input ports 52, 62; and a series of data indicator lights designated 55, 65.

The display module 13 is comprised of a memory 11, a CRT controller 12, and a CRT 14. Information to be displayed on the CRT 14 is transmitted by the CPU 15 over the display bus 16 to the memory 11 where the information is stored until called upon by the CRT control 12 which then causes the information to be displayed on the CRT 14.

It should be appreciated that it is an object of the instant invention to provide a capability for bit error detection for the detection of both soft and hard read errors, and for isolation of errors within a logic system. The operation of the instant invention as embodied by the computer logic system disclosed herein may best be summarized as follows. Upon a request for data from the memory circuit 53 by the CPU 15, the memory circuit 53 causes the desired information to be read and the parity thereof checked to detect any bit errors within the addressed information. If there are no bit errors in the addressed information, the information is forwarded by the memory module 51 to the CPU 15 for further processing. However, in the event that a parity error is detected within the addressed information, the memory module 51 causes the addressed location to be reread and a subsequent parity check is performed on the reread information.

If a parity error is not present in the reread information, thus indicating a soft read error, the addressed information is then forwarded to the CPU 15 for utilization and one of the indicating lights 55 is flashed in order to indicate that a soft read error has occurred. It should be noted, however, that the system processing is not stopped as a result of the detection of a soft read error, but rather there is only a slight delay (i.e. the delay required by the rereading of the addressed location and the checking of the parity thereof) in the processing of the CPU 15.

If a parity error was encountered during the second reading of the addressed location, a signal on line 31 is provided to the CPU 15 indicating that the addressed information contains a bit error. Simultaneously, the addressed location and the contents of the addressed location are provided to input port 52 for later utilization by the CPU 15. The CPU 15, upon receipt of the signal indicating that a hard read error in memory has occurred, causes its processing routine to enter a diagnostic routine which reads the information provided to the input port 52 and subsequently causes this information to be displayed on the CRT 14 in order to facilitate repair of the defective memory.

An additional parity checker 24 exists in the processor module 22. The parity checking circuit 24 checks the incoming data of the bus structure. The presence of a parity checking circuit within the processor module 22 allows the system to distinguish errors that originate in the memory from those errors that originate in the bus structure.

Referring now to FIG. 2 of the drawings, there is disclosed a block diagram illustrating in more detail the memory module 51 shown in FIG. 1.

Communication with the memory module 51 is maintained via the CPU bus 44 and a parity override signal maintained on line 34. In addition, since this is a synchronous system, a system clock signal 21 is supplied to all latches and counters within the system. All bus data is "read" on the leading (positive going) edge of the system clock signal provided on line 21.

A memory location is accessed by outputting from the central processor 15 two bytes (16 bits) of address data via the output bus 42 and the control bus 43. In operation, the CPU 15 outputs the least significant bytes of the memory address on the output bus 42. Simultaneously, the CPU 15 will encode a low byte memory address flag on the three lines of the control bus 43. The control bus decoder 125 will decode the encoded low memory address flag and generate an enable signal for the lower eight bits of the memory address latch 124 via a signal on one of the two lines 303 interconnecting the control bus decoder 125 with the memory address latch 124. On the leading edge of the system clock, the lower eight bits of the sixteen bit memory address will be latched into the memory address latch 124. The second (most significant) byte of the memory address is latched into the memory address latch 124 in a like manner. During the outputting by the CPU 15 of the most significant byte, the signal provided on one of the two conductors 303 between the control bus decoder 125 and the memory address latch 124 will indicate a high byte of memory address, causing this information to be stored accordingly within the memory address latch 124. There is thus provided a means for loading a full bit 16 memory address in the memory latch 124. It should be noted that only eight of the nine bits of the output bus are used for the memory address. The ninth (parity) bit is not used for addressing.

A sixteen bit memory address is capable of addressing 65,536 bytes of data. Since each memory module 51, 61 contains only 16K (16,384) bytes of data, the most significant two bits of the memory address are used to determine if the 16K of memory in a particular memory module is being accessed. To determine this, the two most significant bits are provided on conductors 331 to memory select comparator 313. The two bits of infomation provided on conductors 331 to the memory select comparator 313 are compared with two preselected bits provided by conductor 314 to comparator 313. If the preselected bits in comparator 313 are identical to the two most significant address bits provided on conductor 314, then a signal is generated indicating that this memory module is selected. The indicating signal is provided on conductor 311.

The memory cycle control 118 together with the refresh control 121 provide all of the control signals for the array of memory chips 322. The array of memory chips 322 consists of four groups of nine 4,096 (4K) by one dynamic RAM memory chips 327. Interconnections with the memory array 322 include address inputs (6 bits from the memory address latch 124 via conductors 333, 6 bits from the refresh multiplexer 122 via conductor 328), 9 bits of input data from the write data latch 301 via conductors 306, a 9-bit memory data output to the memory read data latch 163 via conductors 161, and control signals from the memory cycle control 118 via conductors 321.

As mentioned above, the two most significant bits of the memory address are provided to the memory select comparator 313. The next two significant bits of the memory address are provided to the memory cycle control 118 via two conductors of 335. The second two significant bits are used by the memory cycle control 118 to select one of the four banks of memory chips 327. The next six significant bits of the memory address are provided directly to the RAM chips in the memory array 332 from the memory address latch 124 via six conductors of 333. The six least significant bits of the memory address are provided through a refresh multiplexer 122 to the memory array 322 if the memory is not in a refresh cycle, as more fully described below.

As stated above, when both of the memory address bytes are latched into the memory address latch 124, a comparison of the two most significant address bits is made with a preselected memory address contained in memory select comparator 313. If the two sets of address bits are identical, a memory cycle is started via a module select signal provided by the memory select comparator 313 on conductor 311 to the memory cycle control 118. The presence of this signal on conductor 311 initiates a memory cycle. However, at this point the memory does not known if a read or write cycle is desired. Therefore, after the address is outputted, a read or write cycle designation is provided by the CPU 15 on the control bus 43.

If a write signal is indicated on the control bus 43, the control bus decoder 125 will generate a write request signal on conductor 302 to both the memory cycle control 118 and the write data latch 301. Simultaneous with the presentation of the write signal on the control bus 43, the CPU will place the nine bits of write data on the output bus 42. The write request signal presented on conductor 302 will strobe the proper write data into the write data latch 301. This latched write data is applied immediately to the data input of all of the memory chips 327 via the nine signal conductors of 306.

The memory cycle control 118 utilizes the module selected signal presented on conductor 311 to initiate a memory cycle. The two bits of the 16 bit memory address on conductors 335 will select a 4K bank of the memory 327. The write request signal 302 will generate a write signal which will in turn generate the necessary signals to the selected 4K bank of memory 327 in the proper sequence to write data into the memory. The memory cycle control 118 will also inhibit refresh until the memory cycle is complete via signal 320 and generate a memory ready (MRDY) signal on conductor 26 to indicate to the CPU 15 that the write cycle is completed.

The data written in the RAMs 327 is stored in substrate capacitors. Because the charge on these capacitors will change with time due to leakage, the capacitors must be periodically recharged in order to maintain the data. This recharging of the capacitors is commonly called refreshing. The memory chips used in the exemplary embodiment require refreshing at least once every two milliseconds. During the refreshing process, the lower six bits of all the memory chips must cycle through all possible address combinations during each refreshing process. The refresh control 121 causes the memory to be refreshed every 1.8 milliseconds. The refresh process or cycle will cause all 64 combinations of the lower chip address to be presented on conductors 328 at a very high rate. These 64 refresh address combinations are coupled to the refresh multiplexer via the six refresh address lines 312. The lower six bits of the RAM address provided on conductor 328 are switched to the refresh multiplexer via the control signal presented on line 329.

As described above, the refresh cycle will be inhibited via the inhibit signal presented on conductor 320 if a memory read or memory write cycle is in progress. In addition the refresh cycle will be inhibited or interrupted if a memory address is outputted from the CPU 15 via a control signal from the control bus decoder 125 provided on conductor 308.

A read cycle is similar to a write cycle in that the lower eight bits of the memory address are first latched into the memory address latch 124, then the upper eight bits of the memory address are latched into the memory address latch 124. The two most significant bits of the memory address provided on two conductors of 331 are compared with a preselected address 314 to generate a module select signal 311 to the memory cycle control 118. This module select signal 311 will initiate a memory cycle.

The second two most significant memory address bits presented on two conductors of 335 are provided to the memory cycle control 118 and are used to select the desired 4K bank of the memory 322. The memory cycle control 118 will also provide a signal to the refresh control 121 to inhibit any refresh cycle via the signal provided on conductor 320. The memory control cycle 118 will also provide a signal to the CPU 15 that indicates that a memory cycle is in process via the memory ready signal provided on conductor 26.

Thus far the cycle is identical to the initial part of a write cycle. In both cases, the memory does not know if a read or write cycle is required. The CPU 15 causes this information to be provided on the control bus 43. The control bus decoder 125 will decode this read request and generate a read signal on conductor 144 which is provided to the memory cycle control 118. The memory cycle control 118 will use the two memory address bits provided as part of bus 335 and the read request signal provided on conductor 144 to generate the properly timed read signals to the selected 4K bank of the memory 322. The memory cycle control 118 will also generate an enable signal on conductor 323 to the memory read data latch 163. The memory output data provided on bus 161 is stored in the memory read data latch 163. The memory read data from the latch 163 is provided to the parity detector 164 and to the input data bus multiplexer 231. The parity detector 164 checks the nine data bits provided on bus 324 for proper parity. If parity is not proper, a parity fault signal is provided on conductor 145 to the memory cycle control circuit 118. This parity fault signal will be ignored by the memory cycle control circuit 118 if the CPU 15 has generated a parity override signal on conductor 34. It should be noted that the parity override signal provided on conductor 34 is inputted to the memory cycle control circuit 118.

In the case of a parity override, with or without a parity error, the memory cycle control circuit 118 will signal the CPU 15 that a cycle is complete via the memory ready signal provided on conductor 26 after the data is latched in the memory read data latch 163. The read request signal provided on conductor 144 from the control bus decoder 125 to the memory cycle control 118 is also provided to the input data bus multiplexer control 326. This signal, provided on conductor 144, will switch the input data bus multiplexer 231 to read the data presented on bus 324. Thus, the latched memory read data contained in latch 163 is provided to the input bus 41. When the CPU 15 accepts the memory ready signal provided on line 26 there is indicated a completion of a memory read cycle.

In the case where parity is not overriden (i.e. the parity override signal on line 34 is low), the read cycle is identical to the above if the parity detector 164 indicates no parity fault to the memory cycle control circuit 118 via conductor 145.

If a parity error is detected by the parity detector 164 with parity enabled (i.e. the parity oeverride signal is low) the parity fault signal provided on conductor 145 will indicate a parity error to the memory cycle control circuit 118. The memory cycle control circuit 118 will maintain the memory ready signal on conductor 26 in a low state, thus indicating that a memory cycle is not complete. The memory cycle control citcuit 118 will then generate control signals on conducting bus 321 to cause the memory to be reread. If during the second reading of the memory, the parity detector 164 indicates a valid parity, the memory ready signal provided on conductor 26 will be switched to a high state thus indicating to the CPU 15 that the cycle is complete. The memory ready data from the memory read data latch 163 will then be provided on bus 324 which will subsequently be provided to the input bus 41 and accepted by the CPU 15 as valid data. This type of cycle is called a soft read error cycle. The memory cycle control circuit 118 will also light the S-E indicator 39 providing a visible indication of a soft read error generation. The memory cycle control 118 will also generate a soft error fault flag bit on one of the two conductors of 318. This bit will be part of an input port signal discussed below. To summarize, for a soft read error, the memory cycle control 118 will set a fault flag bit 318 and a LED indicator 39 indicating a soft read error has occurred.

If after the second reading of the data, the parity detector 164 still indicates a parity fault, the memory cycle control 118 will generate a memory parity fault signal on conductor 31. This signal will indicate to the CPU that a memory parity fault has occurred. The memory parity fault signal on line 31 is also provided to the control bus decoder 125 to unhibit the decoding of any additional memory signals from the control bus 43. Because memory address signals are now inhibited by the control bus decoder 125, the memory address where the hard parity error occurred is retained in the memory address latch 124. In addition, because the memory address signals are inhibited, additional memory cycles are not possible and the data latched in the memory read data latch 163 remains the data read from the memory causing the parity fault. It should be noted that both the memory address provided on conductors 307 and the memory read data provided on conductors 324 are fed to the input data bus multiplexer 231. These signals will be used as data for an input port to the CPU 15 as described below.

The memory cycle control 118 will also set a fault flag providing a signal on one of the two conductors 318 indicating the presence of a hard read error. This fault flag signal on conductor 318 is also provided to the input data bus multiplexer 231 and will also become data for an input port to the CPU 15. The memory cycle control 118 will also light one of the four (A, B, C, or D) indicators 40 indicating the presence of a hard read error and the corresponding bank of memory chips being accessed during the presence of the parity error.

The memory parity fault signal 31 generated by the memory cycle control 118 will cause the CPU 15 to jump to a routine in the ROM 27 which will cause the CPU 15 to access an input port on each memory module. When the CPU 15 detects a memory module with the fault flag set, the CPU will interrogate the other input ports on this memory module to display the address and actual read data for the parity fault. Below is a description of the operation of an input port of the memory module 51.

The port address is outputted from the CPU 15 via the output bus 42. Simultaneously, the CPU 15 will encode a signal on the control bus 43 to indicate that a port address is present on the output bus. The control bus decoder 125 decodes the control bus 43 and generates a port address enable signal on conductor 304 to the port address latch 236 to latch the port address on the leading edge of the system clock 21. It should be noted that although the memory parity fault signal 31 inhibits the control bus decoder 125 from decoding memory control bus signals, it does not inhibit the decoding of port control bus signals. Therefore, after a hard parity fault, port data can be read although the memory can no longer be accessed. The six most significant bits of the eight port address bits presented on bus 336 from the port address latch 236 are provided to a port select comparator 315. These most significant six bits provided on bus 336 are compared with the six preselected port address bits provided on bus 316. If they are identical, a port address selected signal 317 is generated. This port address signal provided on conductor 317 is provided to the IDB multiplexer control 326 along with the two least significant bits of the port address 332 to select one of four input ports on this memory module. If the port address selected signal 317 is not high, the input data bus multiplexer 231 will not be activated for a port address. When the CPU 15 is ready to accept data from an addressed port it will encode a port read signal on the control bus 43. This will be decoded by the control bus decoder 125 and fed, via conductor 310, to the input data bus multiplexer control 326 to enable the input bus multiplexer 231 if the port address selected signal 317 is high. One of the four input ports on each memory board contains the fault flag data 318 and the parity bit (ninth bit) of the memory read data 324. Another one of the four input ports contains the remaining eight bits of the memory read data 324. The third and fourth ports are used to input the sixteen bits of the latched memory address 307.

The memory cycle control 118 will be described below. Table 1 is a listing of all of the input and output signals of this circuit. It should be noted that all twelve signals 321 interconnecting the memory cycle control 118 with the memory array 322 are listed in Table 1. In addition, each of the five lamp signals 325 is also listed.

Figure 3:
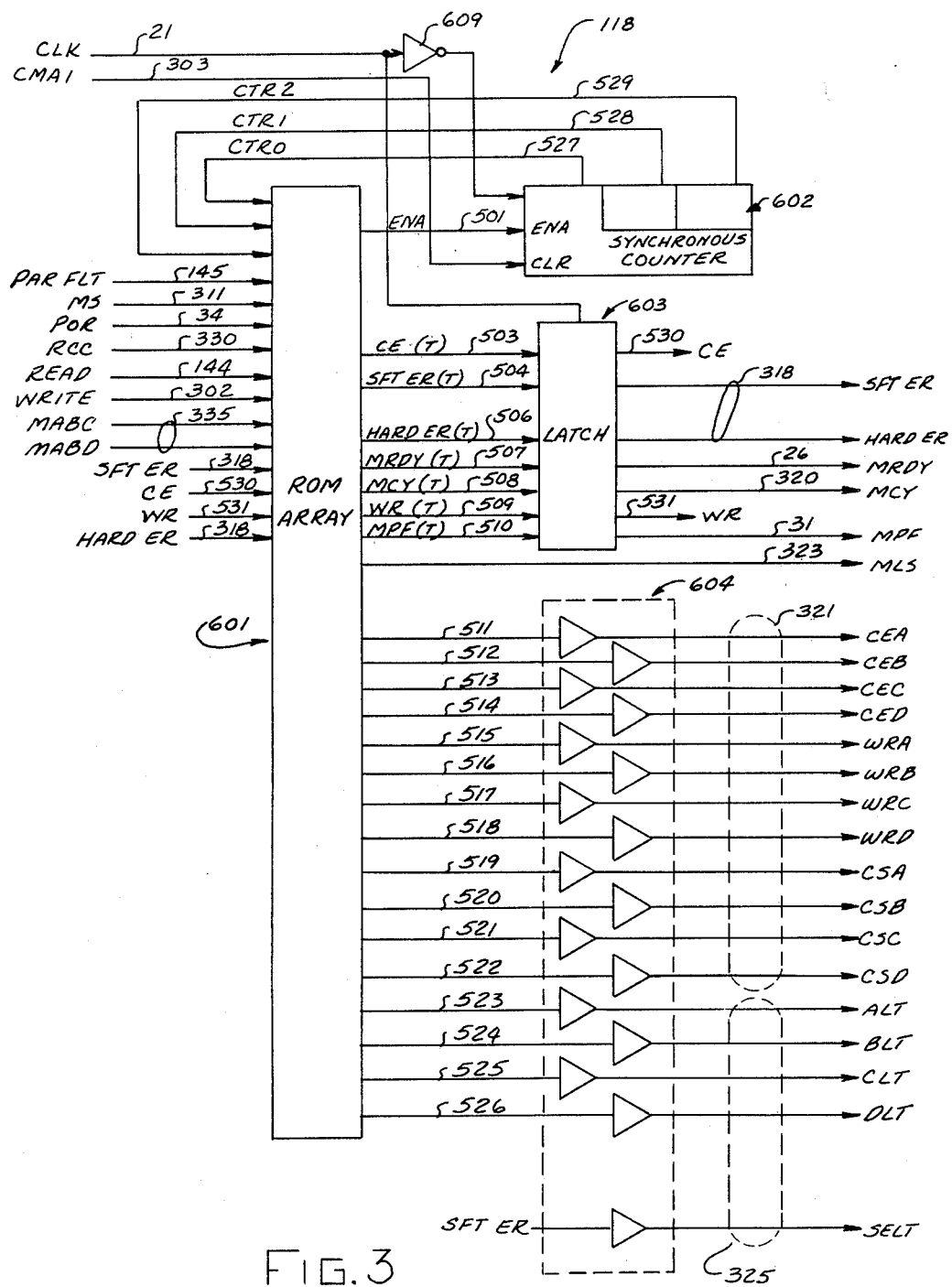
FIG. 3 is a schematic diagram illustrating the circuitry required to implement the memory cycle control of the memory module illustrated in FIG. 2.

FIG. 3 shows the circuitry required to develop the listed outputs from the listed input signals. Most of the inputs are fed to a logic array 601. This logic array 601 can take the form of one or a combination of the following: read only memory (ROM), programmable logic array (PLA), or a combination logic array.

TABLE 1
MEMORY CYCLE CONTROL (118)

| | Inputs: | | Outputs: |
|---|---|---|---|
| 21 | CLK—System Clock | 320 | MCY—Memory Cycle |
| 145 | Par Flt—Parity Fault | 321 | CEA—Chip Enable A Bank |
| 311 | MS—Module Selected | 321 | CEB—Chip Enable B Bank |
| 34 | POR—Parity Override | ↑ | CEC—Chip Enable C Bank |
| 335 | MABC—Memory Address Bit C | ↑ | CED—Chip Enable D Bank |
| 335 | MABD—Memory Address Bit D | ↑ | WRA—Write A Bank |
| 144 | READ—Read Cycle | ↑ | WRB—Write B Bank |
| 330 | RCC—Refresh Control Clock | ↓ | WRC—Write C Bank |
| 302 | WRITE—Write Cycle | ↓ | WRD—Write D Bank |
| 303 | CMA1—Control Bus Memory Address 1st Byte | ↓ | CSA—Chip Select A Bank |
| | | ↓ | CSB—Chip Select B Bank |
| | | ↓ | CSC—Chip Select C Bank |
| | | 321 | CSD—Chip Select D Bank |
| | | 323 | MLS—Memory Latch Strobe |
| | | 325 | ALT—A Bank Parity Fault Light |
| | | ↑ | BLT—B Bank Parity Fault Light |
| | | ↑ | CLT—C Bank Parity Fault Light |
| | | ↓ | DLT—D Bank Parity Fault Light |
| | | 325 | SELT—Soft Error Light |
| | | 318 | SEF—Soft Error Flag |
| | | 318 | HEF—Hard Error Flag |
| | | 26 | MRDY—Memory Ready |
| | | 31 | MPF—Memory Parity Fault |

TABLE 2

Notes:

$CT\phi = \overline{CTR\phi} \cdot \overline{CTR1} \cdot \overline{CTR2}$   $MBA = \overline{MABC} \cdot \overline{MABD}$ $CT1 = CTR\phi \cdot \overline{CTR1} \cdot \overline{CTR2}$   $MBB = MABC \cdot \overline{MABD}$ $CT2 = \overline{CTR\phi} \cdot CTR1 \cdot \overline{CTR2}$   $MBC = \overline{MABC} \cdot MABD$ $CT3 = CTR\phi \cdot CTR1 \cdot \overline{CTR2}$   $MBD = MABC \cdot MABD$ $CT4 = \overline{CTR\phi} \cdot \overline{CTR1} \cdot CTR2$ $CT5 = CTR\phi \cdot \overline{CTR1} \cdot CTR2$ $501 = ENA = (MS \cdot CT\phi \cdot READ) + (MS \cdot CT\phi \cdot WRITE) +$
$(CT1) + (CT2 \cdot \overline{POR} \cdot PAR\ FLT) + (CT3) +$
$(CT4 \cdot \overline{POR} \cdot PAR\ FLT)$ $503 = CE(T) = (RCC) + (CT1) + (CT3)$ $504 = SFT\ ER(T) = (CT4) + (SFT\ ER \cdot \overline{POR})$ $323 = MLS = (CT2) + (CT4)$ $506 = HARD\ ER(T) = CT5 \cdot \overline{POR}$ $507 = MRDY(T) = (CT1 \cdot WR) + (CT2 \cdot WR) + (CT2 \cdot \overline{WR} \cdot POR) +$
$(CT2 \cdot \overline{WR} \cdot \overline{POR} \cdot \overline{PAR\ FLT}) +$
$(CT4 \cdot \overline{POR} \cdot \overline{PAR\ FLT}) + (CT5)$ $508 = MCY(T) = (MS \cdot CT\phi) + (CT1) +$
$(CT2 \cdot \overline{POR} \cdot PAR\ FLT \cdot \overline{WR}) +$
$(CT3) + (CT4 \cdot \overline{POR} \cdot PAR\ FLT)$ $509 = WR(T) = (CT\phi \cdot WRITE) + (CT1 \cdot WR)$

Figure 4:
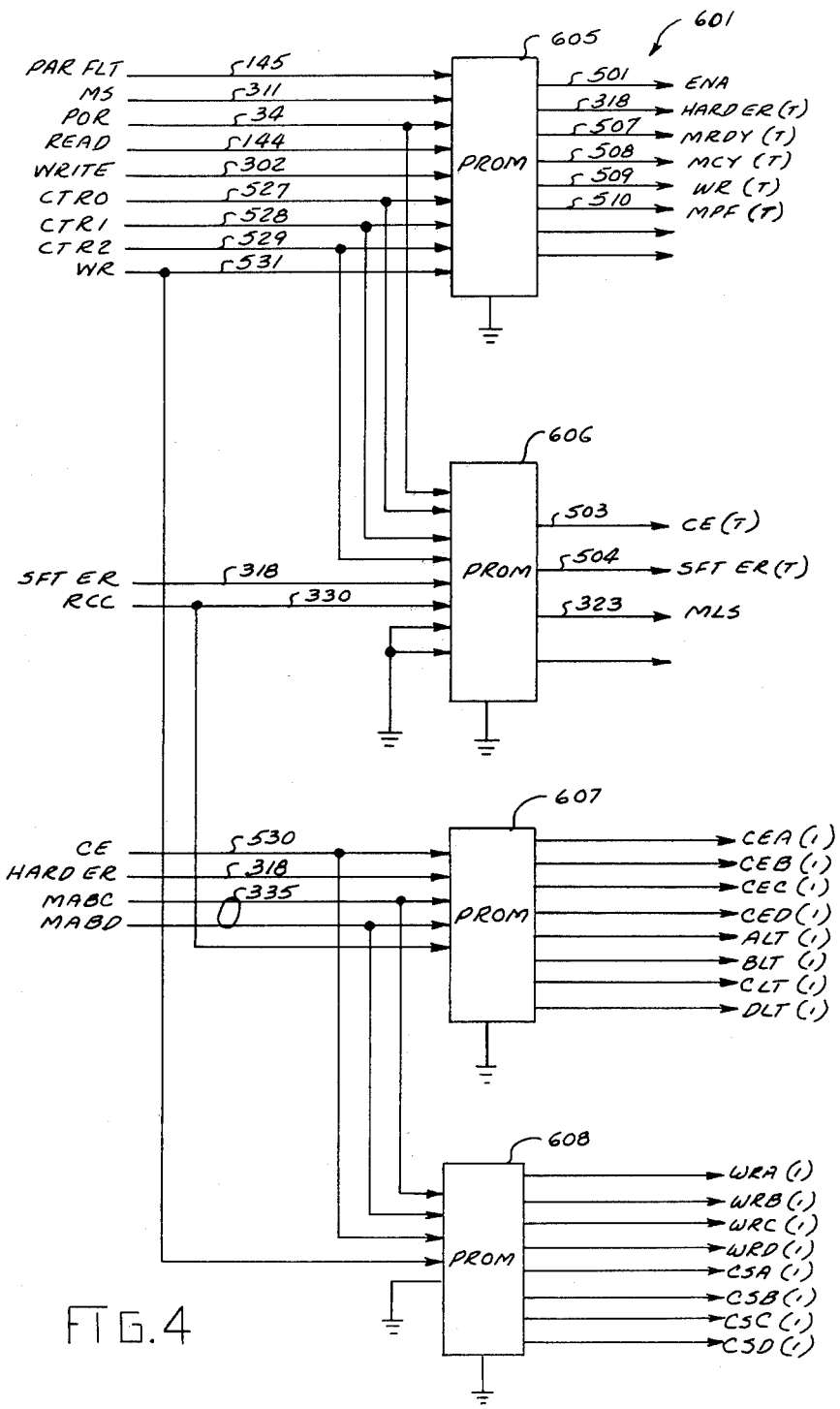
FIG. 4 is a schematic diagram illustrating in more detail the ROM array shown in FIG. 3.

TABLE 2-continued $510 = MPF(T) = CT5 \cdot \overline{POR}$ $511 = CEA(1) = (CE \cdot MBA) + (RCC)$
$512 = CEB(1) = (CE \cdot MBB) + (RCC)$
$513 = CEC(1) = (CE \cdot MBC) + (RCC)$
$514 = CED(1) = (CE \cdot MBD) + (RCC)$
$515 = WRA(1) = WR \cdot MBA$
$516 = WRB(1) = WR \cdot MBB$
$517 = WRC(1) = WR \cdot MBC$
$518 = WRD(1) = WR \cdot MBD$ $519 = CSA(1) = (CE \cdot \overline{WR} \cdot MBA) + (CE \cdot MBA)$ $520 = CSB(1) = (CE \cdot \overline{WR} \cdot MBB) + (CE \cdot MBB)$ $521 = CSC(1) = (CE \cdot \overline{WR} \cdot MBC) + (CE \cdot MBC)$ $522 = CSD(1) = (CE \cdot \overline{WR} \cdot MBD) + (CE \cdot MBD)$ $523 = ALT(1) = HARD\ ER \cdot MBA$
$524 = BLT(1) = HARD\ ER \cdot MBA$
$525 = CLT(1) = HARD\ ER \cdot MBC$
$526 = DLT(1) = HARD\ ER \cdot MBD$ Table 2 gives the Boolean expressions for each of the output signals from the logic array. Anyone skilled in the art can construct a circuit using one or more of the above circuit types and the Boolean expressions given in Table 2. An example of a ROM array is disclosed in FIG. 4.

Some of the outputs of the logic array 601 of FIG. 3 are resynchronized with the system clock in latch 603. It should be noted that some of these resynchronized signals are fed back into the logic array (318, 530, 531). The logic array also provides control signals to a synchronous counter 602. The output of this counter is fed back into the logic array. The combination logic array and counter forms a sequence generator. Inverter 609 inverts the system clock signal to the counter. Therefore, the counter 602 will count or clear on the falling edge of the system clock. A non-inverted system clock could have been used, but using the inverted clock improves speed of the memory cycle. Drivers 604 provide the proper signal levels to drive the memory array 322 and the indicator lamps 39 and 40.

The cycle control counter 602 is reset by the CMA1 303 (first byte of the memory address) to start a cycle. The counter is now at zero. After DMA2 303 (second byte of the memory address) is latched by the memory address latch, the memory select comparator 313 will indicate if this memory module 51 was selected. If the MS 311 signal from the memory select comparator 313 to the memory cycle control 118 is a logic zero the cycle control counter 602 will remain at zero because the ENA 501 will never permit the cycle control counter 602 to count from the zero state without MS 311 high.

Table 2 gives the Boolean expression for ENA 501 as:

$$501 = ENA = (MS \cdot CT\phi \cdot READ) + (MS \cdot CT\phi \cdot WRITE) + (CT1) + (CR2 \cdot \overline{POR} \cdot PAR\ FLT) + (CT3) + (CT4 \cdot \overline{POR} \cdot PAR\ FLT)$$

Interpreting the above equation we see that the counter 602 will not count off zero ($CT\phi = \overline{CTR0} \cdot \overline{CTR1} \cdot \overline{CTR2}$) unless MS 311 is a logic one and either a read 144 or write 302 cycle is programmed. Thus, the cycle will wait for the control bus decoder to indicate a read or write cycle before the count is advanced. If another module were selected (MS 311 is a logic zero) the counter 602 will not advance off zero.

The equation for ENA 501 also shows that the counter will always count from one (CT1) to two (CT2). However, it will only advance from two (CT2) to three (CT3) if parity is not overridden ($\overline{POR}$ = Logic 1) and a parity fault is detected (PAR FLT = Logic 1). Therefore, the only time the cycle control counter 602 exceeds the count of two (CT2) is when a parity fault is detected. The counter 602 will always count from three (CT3) to four (CT4). However, if a parity error is detected on the fourth count, the counter will count to five and stop. The count of 5 (CT5) indicates a hard error. Note that the equation for memory parity fault (MPF (T)) shows that a parity fault 510 signal is generated at the count of 5 (CT5). As stated previously, this signal is fed, as the output of a latch 603, to the control bus decoder 125. This signal inhibits any additional memory address decodes. Therefore, it inhibits any additional memory cycles.

Figure 5:
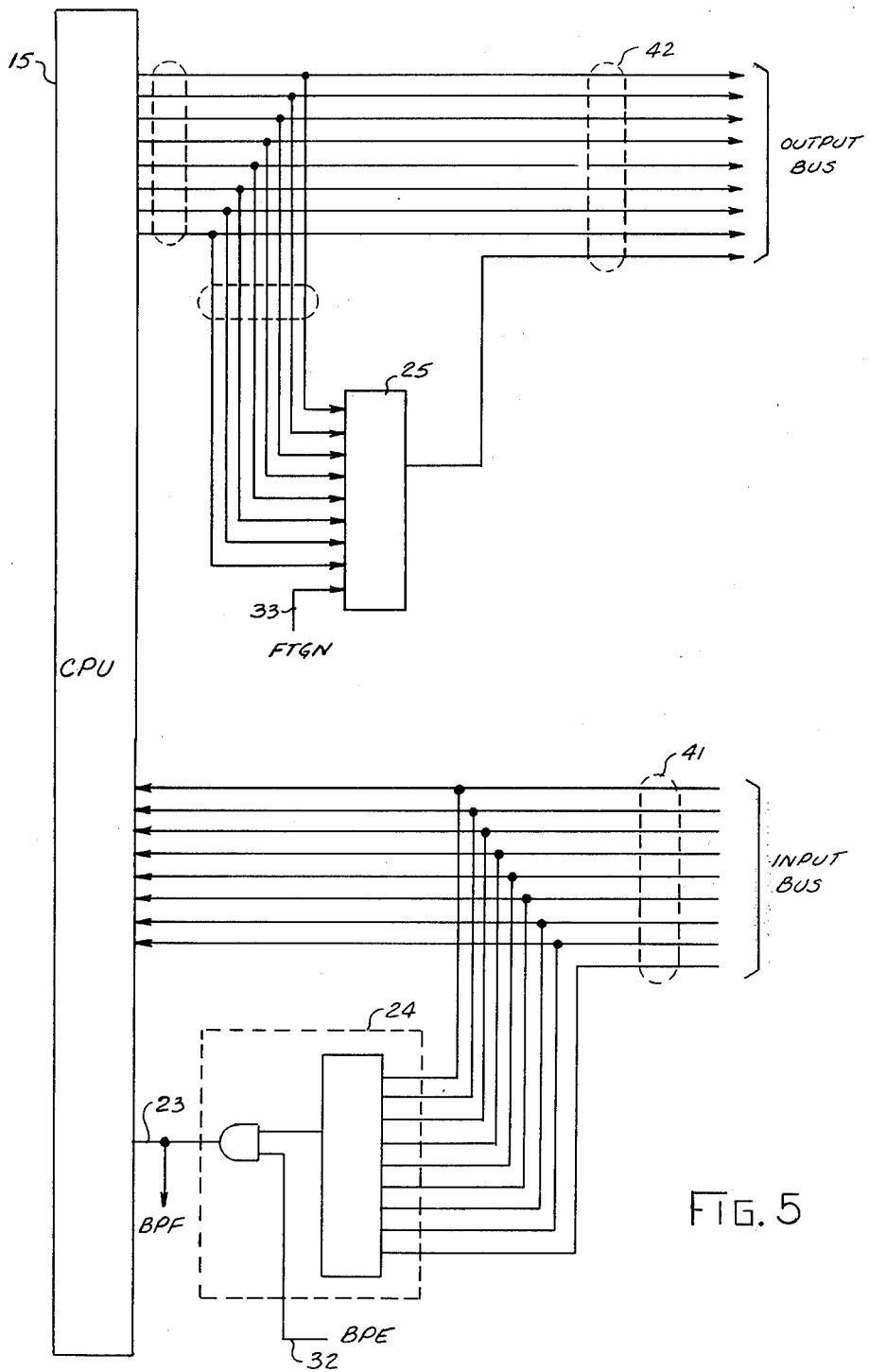
FIG. 5 is a schematic diagram illustrating the circuitry employed to implement the parity checker and parity generator shown in FIG. 1.

Parity is generated using a TI SN 74S280 integrated circuit mounted on the CPU module (25 of FIG. 1). FIG. 1 block 22 shows the CPU module. Circuit 25 within the CPU module 22 is the parity generator. Input to this parity generator is the 8 data bits from the CPU 15. The parity generator 25 sensed the parity of the 8 data bits and generates the 9th bit or parity bit based on the parity of the 8 data bits and a fault generator signal from output port 35. The signal level on this fault generator line 33 will determine the parity (odd or even) to be generated on the output data bus. FIG. 5 is a detail showing how the TI SN 74S280 is used as a parity generator for this application. The 8 bits outputted from the CPU 15 are shown in FIGS. 1 and 5. These 8 bits are fed to the input of the parity generator 25 along with the FTGN signal on line 33 from the output port 35. The parity generator 25 will output a logic 1 when an odd number of inputs are at a logic 1. This output is used as the 9th bit of the output bus 42. Valid parity is defined as an even number of logic ones on the 9 bit data bus. Therefore, input 33 can be used to generate a parity fault (odd number of logic ones) by being a logic one, or proper parity (even number of logic ones) will be generated when input 33 is a logic zero.

Thus, output port 35 can be used to generate a parity fault by bringing port bit 33 to a logic one. This capability is used to test parity detection circuits in the system for proper operation. Thus, the system has a means to self-test the parity circuitry.

All 9 bits of the input bus 41 are fed to the parity check circuit 24. This circuit consists of a TI SN 74S290 24 together with a two-input AND gate (See FIG. 5). The BPE (bus parity enable) signal on line 32 is generated by the output port 35 and enables the output of the parity check circuit 24. Thus, the output port 35 can override a bus parity fault. The output signal 23 of the parity check circuit 24 will reset the program counter of the CPU 15 when a bus parity error is detected. (The MPF signal 37 will also reset the CPU program counter when a memory parity error is detected.)

Since the program counter is reset, the CPU reads instructions from the ROM 27 (Address "0000" to "0FFF"). The program resident in this ROM 27 will instruct the CPU 15 to read input port 36 on the CPU module.

When the CPU reads input port 36, it can determine if a bus parity fault or a memory parity fault caused the CPU program counter to reset. If the memory parity fault bit is set the CPU will jump to a routine in ROM 27 to read all the input ports 52, 62 of the memory modules 51, 61 to determine which memory module caused the parity fault and, by reading other input ports 52, 62 on this memory module, the address and data of the parity fault. This data will then be transferred to the display module 13 for display on a CRT 14.

If the CPU reads input port 36 and the BPF bit 23 is set but the MPF bit 37 is not set (both bits will set for a MPF) the CPU will jump to a routine in ROM 27 to display a "Bus Parity Fault" statement on the CRT 14. The CPU will also output a bit to output port 35 to light LED 38 indicating a bus parity fault.

The CPU 15 can also output bits to output port 35 to inhibit memory parity errors (POR 34) or inhibit bus parity errors (BPE 32). These features provide extensive flexibility in both error detection and location of the error (bus between the CPU and memory or actual location of a memory parity error). They also enable the system to test itself by programming a parity error and detecting its result.

In summation, a system has been disclosed wherein a read operation of a memory is accompanied by a monitoring function to determine whether an outputted data word exhibits a parity fault condition. If not, then the outputted data word is routed to a utilization means, such as a CPU. If a parity fault was detected, then the memory is read a second time. If on the second reading the outputted data word does not include a parity fault, then the error associated with the first reading may be termed a "soft read error". This outputted data word is then routed to a utilization means. If the second reading produced another parity fault, then the output would be classified a "hard read error" or memory error. It is contemplated that when the invention is used in conjunction with a CPU or the like, that an output be supplied to the CPU alerting it that a memory error condition exists. When used with a CPU, the interrupt to the CPU indicative of the memory error will cause the CPU to enter a routine to poll various ones of a plurality of external memory circuits to determine where the memory error took place and the address within the memory at which data is being outputted, together with that data.

In addition, there are provided means for additionally checking the parity of the data provided to the utilization means from the memory. The checking of the parity at the utilization means allows the logic system to distinguish between memory errors and data transmission errors in order to facilitate the repair of the logic system.

Whereas the invention has been described in conjunction with a particular embodiment, it is to be appreciated that various modifications and arrangements of parts may be made without departing from the spirit and scope of the invention as defined by the appended claims.

We claim:

1. A method for isolating data errors in a logic system having memory means and data transmission means, for transmitting data from the memory means to a utilization device, comprising the steps of:
   (a) checking the data from said memory means for data errors before transmitting to the utilization device and inhibiting transmission if a data error is present;
   (b) storing a logic state indicative of the presence of a data error in the data from said memory means in a first register means;
   (c) checking the data transmitted from the memory means by the transmission means for data errors;
   (d) storing a logic state indicative of the presence of a data error in the data from said transmission means in a second register means;
   (e) reading the logic states of said first and second register means; and,
   (f) displaying a visual indicia indicative of the logic states of said first and second register means.

* * * * *